United States Patent
Helmenstein

(10) Patent No.: US 9,283,879 B2
(45) Date of Patent: Mar. 15, 2016

(54) AIR CONVEYOR

(71) Applicant: W.E.T. Automotive Systems AG, Odelzhausen (DE)

(72) Inventor: Winfried Helmenstein, München (DE)

(73) Assignee: GENTHERM GMBH, Odelzhausen (DE)

(*) Notice: Subject to any disclaimer, the term of this patent is extended or adjusted under 35 U.S.C. 154(b) by 542 days.

(21) Appl. No.: 13/676,444

(22) Filed: Nov. 14, 2012

(65) Prior Publication Data
US 2013/0164123 A1 Jun. 27, 2013

(30) Foreign Application Priority Data
Dec. 26, 2011 (DE) .................... 10 2011 121 980

(51) Int. Cl.
| | | |
|---|---|---|
| *F01D 1/00* | (2006.01) | |
| *B60N 2/56* | (2006.01) | |
| *F04D 17/08* | (2006.01) | |
| *F04D 17/02* | (2006.01) | |
| *F04D 29/42* | (2006.01) | |

(52) U.S. Cl.
CPC ............ *B60N 2/5621* (2013.01); *B60N 2/5657* (2013.01); *F04D 17/025* (2013.01); *F04D 17/08* (2013.01); *F04D 29/4246* (2013.01)

(58) Field of Classification Search
CPC .... B60N 2/5621; B60N 2/5657; F04D 17/25; F04D 29/4246; F04D 17/08; F04D 25/10; F04D 29/4213; F04D 29/4253; F04D 29/441; F04D 29/462; F04D 29/541
See application file for complete search history.

(56) References Cited

U.S. PATENT DOCUMENTS

| | | |
|---|---|---|
| 1,370,832 A | 3/1921 | Mollberg |
| 1,439,681 A | 12/1922 | Alkire et al. |
| 1,514,329 A | 11/1924 | Metcalf |
| 2,022,959 A | 12/1935 | Gordon |
| 2,158,801 A | 5/1939 | Petterson |
| 2,703,134 A | 3/1955 | Mossor |
| 2,758,532 A | 8/1956 | Awe |
| 2,782,834 A | 2/1957 | Vigo |
| 2,791,956 A | 5/1957 | Guest |

(Continued)

FOREIGN PATENT DOCUMENTS

| | | |
|---|---|---|
| DE | 37 05 756 | 10/1988 |
| DE | 19503291 | 8/1996 |

(Continued)

OTHER PUBLICATIONS

Excerpt from website http://www.seatcomfort.com/ventilation.htm, Specializing in Seat Ventilation and Heating Systems, Ventilation.

(Continued)

*Primary Examiner* — Troy Chambers
*Assistant Examiner* — Joshua Semick
(74) *Attorney, Agent, or Firm* — The Dobrusin Law Firm, P.C.

(57) ABSTRACT

The present teachings relate to an air feed device with at least one impeller, with at least one housing that at least partially surrounds the impeller, with at least one intake opening for inward suction of air into an operating space of the impeller, with at least one opening to blow out air from the operating space of impeller. Provision is made that the air feed device has at least one additional through-passage opening for air.

19 Claims, 4 Drawing Sheets

(56) References Cited

U.S. PATENT DOCUMENTS

| | | | |
|---|---|---|---|
| 2,811,094 A * | 10/1957 | Auer | 454/310 |
| 2,826,135 A | 3/1958 | Benzick | |
| 2,992,604 A | 7/1961 | Trotman et al. | |
| 2,992,605 A | 7/1961 | Trotman et al. | |
| 3,030,145 A | 4/1962 | Kotteman | |
| 3,101,037 A | 8/1963 | Taylor | |
| 3,101,660 A | 8/1963 | Taylor | |
| 3,127,931 A | 4/1964 | Johnson | |
| 3,131,967 A | 5/1964 | Spaulding | |
| 3,162,489 A | 12/1964 | Trotman | |
| 3,209,380 A | 10/1965 | Watsky | |
| 3,486,177 A | 12/1969 | Marshack | |
| 3,529,310 A | 9/1970 | Olmo | |
| 3,550,523 A | 12/1970 | Segal | |
| 3,653,590 A | 4/1972 | Elsea | |
| 3,681,797 A | 8/1972 | Messner | |
| 3,684,170 A | 8/1972 | Roof | |
| 3,736,022 A | 5/1973 | Radke | |
| 3,738,702 A | 6/1973 | Jacobs | |
| 3,757,366 A | 9/1973 | Sacher | |
| 3,770,318 A | 11/1973 | Fenton | |
| 3,778,851 A | 12/1973 | Howorth | |
| 3,948,246 A | 4/1976 | Jenkins | |
| 4,002,108 A | 1/1977 | Drori | |
| 4,043,544 A | 8/1977 | Ismer | |
| 4,060,276 A | 11/1977 | Lindsay | |
| 4,072,344 A | 2/1978 | Li | |
| 4,141,585 A | 2/1979 | Blackman | |
| 4,259,896 A | 4/1981 | Hayashi et al. | |
| 4,413,857 A | 11/1983 | Hayashi | |
| 4,509,792 A | 4/1985 | Wang | |
| 4,572,430 A | 2/1986 | Takagi et al. | |
| 4,589,656 A | 5/1986 | Baldwin | |
| 4,685,727 A | 8/1987 | Cremer et al. | |
| 4,712,832 A | 12/1987 | Antolini et al. | |
| 4,729,598 A | 3/1988 | Hess | |
| 4,777,802 A | 10/1988 | Feher | |
| 4,802,405 A * | 2/1989 | Ichitani et al. | 454/75 |
| 4,847,933 A | 7/1989 | Bedford | |
| 4,853,992 A | 8/1989 | Yu | |
| 4,866,800 A | 9/1989 | Bedford | |
| 4,905,475 A | 3/1990 | Tuomi | |
| 4,923,248 A | 5/1990 | Feher | |
| 4,946,220 A | 8/1990 | Wyon et al. | |
| 4,981,324 A | 1/1991 | Law | |
| 4,997,230 A | 3/1991 | Spitalnick | |
| 5,002,336 A | 3/1991 | Feher | |
| 5,004,294 A | 4/1991 | Lin | |
| 5,016,302 A | 5/1991 | Yu | |
| 5,102,189 A | 4/1992 | Saito et al. | |
| 5,106,161 A | 4/1992 | Meiller | |
| 5,117,638 A | 6/1992 | Feher | |
| 5,138,851 A | 8/1992 | Mardikian | |
| 5,160,517 A | 11/1992 | Hicks et al. | |
| 5,211,697 A | 5/1993 | Kienlein et al. | |
| 5,226,188 A | 7/1993 | Liou | |
| 5,292,577 A | 3/1994 | Van Kerrebrouck et al. | |
| 5,354,117 A | 10/1994 | Danielson et al. | |
| 5,370,439 A | 12/1994 | Lowe et al. | |
| 5,372,402 A | 12/1994 | Kuo | |
| 5,382,075 A | 1/1995 | Shih | |
| 5,385,382 A | 1/1995 | Single, II et al. | |
| 5,403,065 A | 4/1995 | Callerio | |
| 5,408,711 A | 4/1995 | McClelland | |
| 5,411,318 A | 5/1995 | Law | |
| 5,416,935 A | 5/1995 | Nieh | |
| 5,450,894 A | 9/1995 | Inoue et al. | |
| 5,561,875 A | 10/1996 | Graebe | |
| 5,590,428 A | 1/1997 | Roter | |
| 5,597,200 A | 1/1997 | Gregory et al. | |
| 5,613,729 A | 3/1997 | Summer, Jr. | |
| 5,613,730 A | 3/1997 | Buie et al. | |
| 5,626,021 A | 5/1997 | Karunasiri et al. | |
| 5,626,386 A | 5/1997 | Lush | |
| 5,626,387 A | 5/1997 | Yeh | |
| 5,645,314 A | 7/1997 | Liou | |
| 5,692,952 A | 12/1997 | Chih-Hung | |
| 5,701,621 A | 12/1997 | Landi et al. | |
| 5,715,695 A | 2/1998 | Lord | |
| 5,787,534 A | 8/1998 | Hargest et al. | |
| 5,833,309 A | 11/1998 | Schmitz | |
| 5,833,321 A | 11/1998 | Kim et al. | |
| 5,887,304 A | 3/1999 | Von der Heyde | |
| 5,902,014 A | 5/1999 | Dinkel et al. | |
| 5,918,930 A | 7/1999 | Kawai et al. | |
| 5,921,100 A | 7/1999 | Yoshinori et al. | |
| 5,921,314 A | 7/1999 | Schuller et al. | |
| 5,921,858 A | 7/1999 | Kawai et al. | |
| 5,924,766 A | 7/1999 | Esaki et al. | |
| 5,924,767 A | 7/1999 | Pietryga | |
| 5,927,817 A | 7/1999 | Ekman et al. | |
| 5,934,748 A | 8/1999 | Faust et al. | |
| 6,003,950 A | 12/1999 | Larsson | |
| 6,019,420 A | 2/2000 | Faust et al. | |
| 6,048,024 A | 4/2000 | Wallman | |
| 6,059,018 A | 5/2000 | Yoshinori et al. | |
| 6,062,641 A | 5/2000 | Suzuki et al. | |
| 6,064,037 A | 5/2000 | Weiss et al. | |
| 6,068,332 A | 5/2000 | Faust et al. | |
| 6,079,485 A | 6/2000 | Esaki et al. | |
| 6,085,369 A | 7/2000 | Feher | |
| 6,105,667 A | 8/2000 | Yoshinori et al. | |
| 6,109,688 A | 8/2000 | Wurz et al. | |
| 6,145,925 A | 11/2000 | Eksin et al. | |
| 6,164,719 A | 12/2000 | Rauh | |
| 6,179,706 B1 | 1/2001 | Yoshinori et al. | |
| 6,186,592 B1 | 2/2001 | Orizaris et al. | |
| 6,189,966 B1 | 2/2001 | Faust et al. | |
| 6,196,627 B1 | 3/2001 | Faust et al. | |
| 6,224,150 B1 | 5/2001 | Eksin et al. | |
| 6,263,530 B1 | 7/2001 | Feher | |
| 6,273,810 B1 | 8/2001 | Rhodes et al. | |
| 6,277,023 B1 | 8/2001 | Schwarz | |
| 6,283,726 B1 | 9/2001 | Fackelmann et al. | |
| 6,291,803 B1 | 9/2001 | Fourrey | |
| 6,478,369 B1 | 11/2002 | Aoki et al. | |
| 6,481,801 B1 | 11/2002 | Schmale | |
| 6,491,578 B2 | 12/2002 | Yoshinori et al. | |
| 6,497,275 B1 | 12/2002 | Elliot | |
| 6,505,886 B2 | 1/2003 | Gielda et al. | |
| 6,511,125 B1 | 1/2003 | Gendron | |
| 6,541,737 B1 | 4/2003 | Eksin et al. | |
| 6,578,910 B2 | 6/2003 | Andersson et al. | |
| 6,592,181 B2 | 7/2003 | Stiller et al. | |
| 6,598,405 B2 | 7/2003 | Bell | |
| 6,604,785 B2 | 8/2003 | Bargheer et al. | |
| 6,619,736 B2 | 9/2003 | Stowe et al. | |
| 6,626,488 B2 | 9/2003 | Pfahler | |
| 6,629,724 B2 | 10/2003 | Ekern et al. | |
| 6,629,725 B1 | 10/2003 | Kunkel et al. | |
| 6,676,207 B2 | 1/2004 | Rauh et al. | |
| 6,682,140 B2 | 1/2004 | Minuth et al. | |
| 6,685,553 B2 | 2/2004 | Aoki | |
| 6,687,937 B2 | 2/2004 | Harker | |
| 6,719,534 B2 | 4/2004 | Aoki et al. | |
| 6,719,624 B2 | 4/2004 | Hayashi et al. | |
| 6,722,148 B2 | 4/2004 | Aoki et al. | |
| 6,761,399 B2 | 7/2004 | Bargheer et al. | |
| 6,767,621 B2 | 7/2004 | Flick et al. | |
| 6,786,541 B2 | 9/2004 | Haupt et al. | |
| 6,786,545 B2 | 9/2004 | Bargheer et al. | |
| 6,793,016 B2 | 9/2004 | Aoki et al. | |
| 6,808,230 B2 | 10/2004 | Buss et al. | |
| 6,817,675 B2 | 11/2004 | Buss et al. | |
| 6,826,792 B2 | 12/2004 | Lin | |
| 6,848,742 B1 | 2/2005 | Aoki et al. | |
| 6,857,697 B2 | 2/2005 | Brennan et al. | |
| 6,869,139 B2 | 3/2005 | Brennan et al. | |
| 6,869,140 B2 | 3/2005 | White et al. | |
| 6,871,696 B2 | 3/2005 | Aoki et al. | |
| 6,892,807 B2 | 5/2005 | Fristedt et al. | |
| 6,893,086 B2 | 5/2005 | Bajic et al. | |
| 6,929,322 B2 | 8/2005 | Aoki et al. | |
| 6,957,545 B2 | 10/2005 | Aoki | |

(56) References Cited

U.S. PATENT DOCUMENTS

| | | | |
|---|---|---|---|
| 6,976,734 B2 | 12/2005 | Stoewe | |
| 7,013,653 B2 | 3/2006 | Kamiya et al. | |
| 7,040,710 B2 | 5/2006 | White et al. | |
| 7,052,091 B2 | 5/2006 | Bajic et al. | |
| 7,070,232 B2 | 7/2006 | Minegishi et al. | |
| 7,083,227 B2 | 8/2006 | Brennan et al. | |
| 7,114,771 B2 | 10/2006 | Lofy et al. | |
| 7,131,689 B2 | 11/2006 | Brennan et al. | |
| 7,147,279 B2 | 12/2006 | Bevan et al. | |
| 7,168,758 B2 | 1/2007 | Bevan et al. | |
| 7,338,117 B2 | 3/2008 | Iqbal et al. | |
| 7,356,912 B2 | 4/2008 | Iqbal et al. | |
| 7,370,911 B2 | 5/2008 | Bajic et al. | |
| 7,827,805 B2 | 11/2010 | Comiskey | |
| 2004/0195870 A1 | 10/2004 | Bohlender et al. | |
| 2005/0066505 A1 | 3/2005 | Iqbal et al. | |
| 2005/0067862 A1 | 3/2005 | Iqbal et al. | |
| 2005/0093347 A1 | 5/2005 | Bajic et al. | |
| 2005/0140189 A1 | 6/2005 | Bajic et al. | |
| 2005/0173950 A1 | 8/2005 | Bajic et al. | |
| 2005/0200179 A1 | 9/2005 | Bevan et al. | |
| 2006/0138810 A1 | 6/2006 | Knoll et al. | |
| 2006/0152044 A1 | 7/2006 | Bajic et al. | |
| 2006/0158011 A1 | 7/2006 | Marlovits et al. | |
| 2007/0001507 A1 | 1/2007 | Brennan et al. | |
| 2007/0176471 A1 | 8/2007 | Knoll | |
| 2009/0145583 A1* | 6/2009 | Han | 165/121 |
| 2011/0186560 A1* | 8/2011 | Kennedy et al. | 219/217 |

FOREIGN PATENT DOCUMENTS

| | | |
|---|---|---|
| DE | 19909507 C1 | 11/2000 |
| DE | 10013492 | 9/2001 |
| DE | 10030708 | 1/2002 |
| DE | 10144839 | 3/2003 |
| DE | 202008000855 U1 | 5/2008 |
| EP | 0 280 213 | 8/1988 |
| EP | 1266794 | 12/2002 |
| EP | 1323573 | 7/2003 |
| FR | 2599683 | 6/1986 |
| GB | 1493205 A | 11/1977 |
| JP | 1171509 | 7/1989 |
| JP | 5277020 | 10/1993 |
| JP | 10044756 | 2/1998 |
| JP | 2000125990 | 2/2000 |
| JP | 2001071800 | 3/2001 |
| JP | 2002125801 | 5/2002 |
| JP | 2002234332 | 8/2002 |
| JP | 2004224108 | 8/2004 |
| WO | 96/05475 | 2/1996 |
| WO | 97/09908 | 3/1997 |
| WO | 02/053410 | 7/2002 |
| WO | 03/051666 | 6/2003 |
| WO | 03/077710 | 9/2003 |
| WO | 03/101777 | 12/2003 |
| WO | 2004/028857 | 4/2004 |
| WO | 2004/078517 | 9/2004 |
| WO | 2005/021320 | 3/2005 |
| WO | 2005/035305 | 4/2005 |
| WO | 2005/042301 | 5/2005 |
| WO | 2005/047056 | 5/2005 |
| WO | 2005/068253 | 7/2005 |
| WO | 2005/110806 | 11/2005 |

OTHER PUBLICATIONS

GMT 830 Heating & Ventilation System, IGB Automotive Ltd., received by Assignee W.E.T. Automotive Systems, Jun. 2003.

Specializing in Seat Ventilation and Heating Systems, Seat Comfort Systems, http://www.seatcomfort.comsemashow1.htm, Jun. 10, 2003.

German Office action, Application No. 102011121980.7, dated Nov. 20, 2012 (Cited as to the references cited in the Office Action).

* cited by examiner

AIR CONVEYOR

FIELD

The present teachings provide an air feed device comprising at least one impeller, at least one housing which at least partially surrounds the impeller, with at least one suction intake opening for intake of air into an operating space.

BACKGROUND

Ventilated seats with axial or radial fans are known, Often the nonuniform distribution of air is disadvantageous.

Additional prior art on seat surfaces, are air distribution layers that are impinged on from their front edges or through their flat surface by an air flow, Great energy consumption and space requirements are often undesired. However, generic systems should be distinguished in having effective air conditioning regardless of the type of passenger.

SUMMARY

The present teachings provide an air feed device with at least one impeller, at least one housing which at least partially surrounds the impeller, with at least one suction intake opening for intake of air into an operating space of the impeller, with at least one blow-out opening for blowing of air out of the operating space of the impeller, characterized in that the air feed device has at least one additional through-passage opening for air.

The present teachings provide for a seat with an air feed device according to the teachings herein.

The present teachings provide for a vehicle with an air feed device or a seat according to the teachings herein.

In what follows in the specification and claims, particulars of the invention are explained. However, these presentations are only of an exemplary nature. Within the scope of the claims, features can also be deleted, transformed, or supplemented, or multiple embodiment forms can be combined. If a feature is only to be partially implemented, this includes the feature also being completely implemented, or in essentials. What is decisive is that the desired utility be attained to a recognizable extent; for example, in that a feature is at least 50%, 90%, 95% or 99% implemented. The minimum amounts indicated may be exceeded. What is described as an object, can also hold true for a part or the totality of other objects of the same type. If not excluded, the intervals also include their edge points. The application claims the benefit of priority of German Patent Application No. DE 10 2011 121 980.7, filed Dec. 26, 2011, incorporated by reference herein for all purposes.

BRIEF DESCRIPTION OF THE DRAWINGS

In what follows, reference is made to

FIG. 3a Top-down view of a first embodiment form of an air feed device with an opened cover and removed impeller, with an interior worm-gear housing for the radial impeller and an outer distributor device integrated into the housing with a suction opening, a guiding device, an outer worm passage and distributor openings.

DETAILED DESCRIPTION

Figure 1:
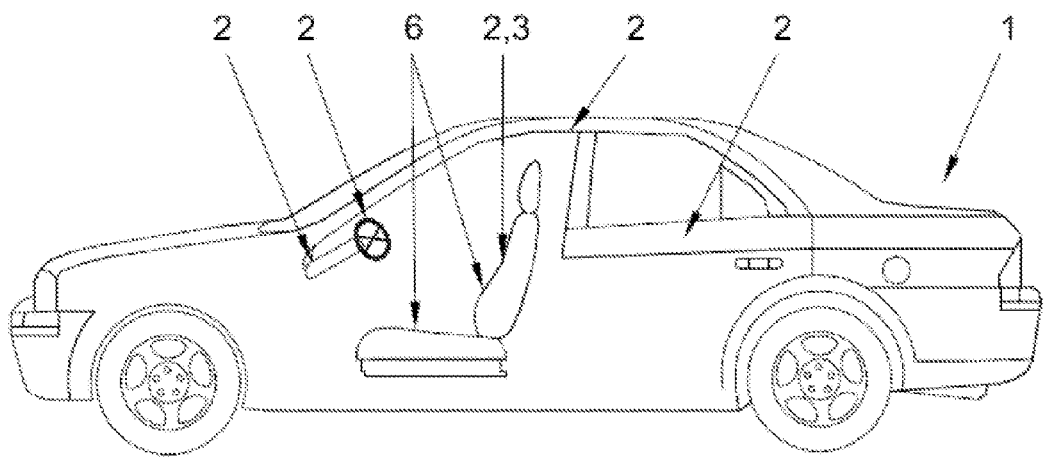
FIG. 1 Vehicle with air-conditioned seat in a partial longitudinal section.
Figure 2A:
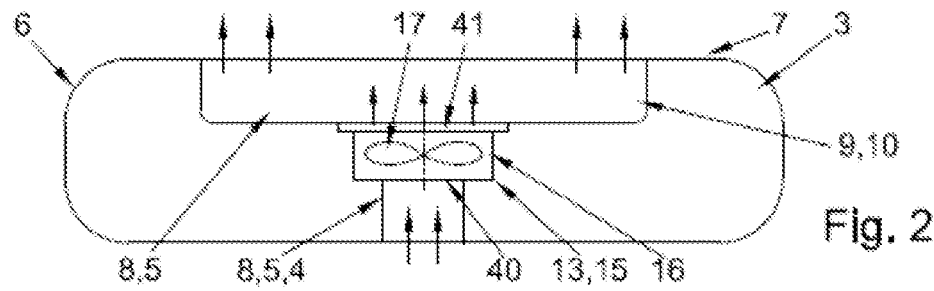
FIG. 2a A first embodiment form of seat upholstery of the motor vehicle from FIG. 1 in longitudinal section, with a radial fan which rotates in a plane parallel to an air distribution layer acting as an air distribution device, and which blows out parallel to the rotational axis of the impeller into the air distribution device situated on an A side of the seat upholstery.
Figure 2B:
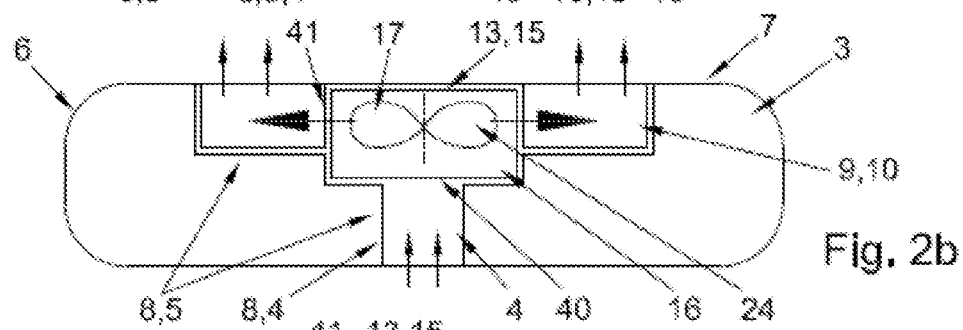
FIG. 2b A second embodiment form of seat upholstery of the vehicle from FIG. 1 in longitudinal section, with a radial fan which rotates parallel to an air distribution layer acting as an air distribution device and blows out in alignment to the course of the air distribution device into the air distribution device placed on an A side of the seat upholstery.
Figure 2C:
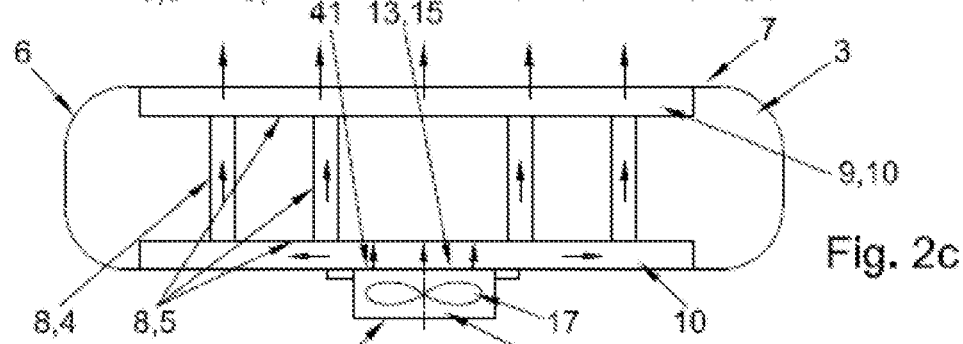
FIG. 2c A third embodiment form of seat upholstery of the vehicle from FIG. 1 in longitudinal section, with a radial fan that rotates parallel to, and below, an air distribution layer acting as an air distribution device and blows out parallel to the rotational axis of the impeller into an air distribution device placed on a B side of seat upholstery, which for its part is connected through perpendicular openings with an A side of the seat upholstery.
Figure 2D:
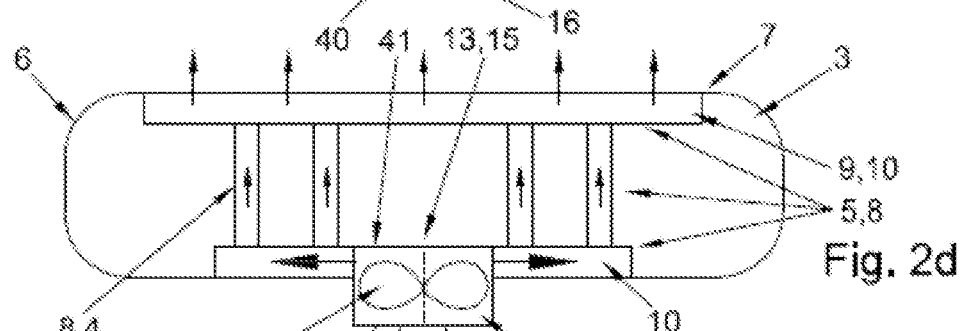
FIG. 2d A fourth embodiment form of seat upholstery of the vehicle from FIG. 1 in longitudinal section, with a radial fan that rotates parallel to and partially below and partially within an air distribution layer acting as an air distribution device, and blows out parallel to the rotational place of the impeller into an air distribution device placed on a B side of seat upholstery, which for its part is connected through perpendicular openings with an A side of the seat upholstery.
Figure 2E:
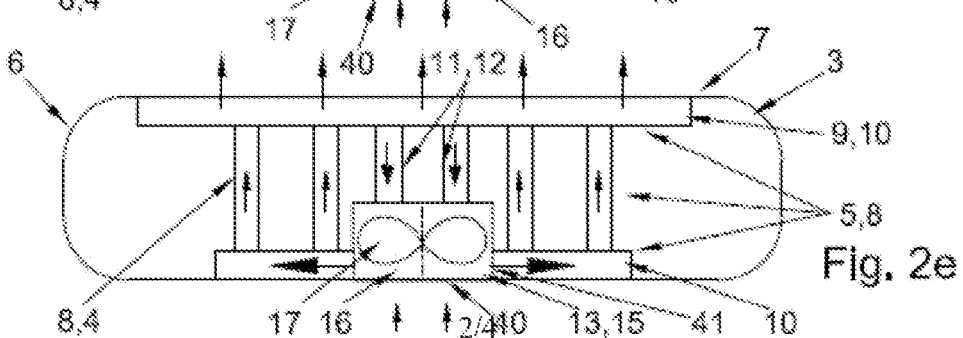
FIG. 2e A fifth embodiment form of seat upholstery of the vehicle from FIG. 1 in longitudinal section, with a radial fan that rotates parallel to and partially above, and partially within, an air distribution layer acting as an air distribution device, and blows out into an air distribution device situated on a B side of seat upholstery, which for its part is connected through perpendicular openings with an A side of the seat upholstery.
Figure 3A:
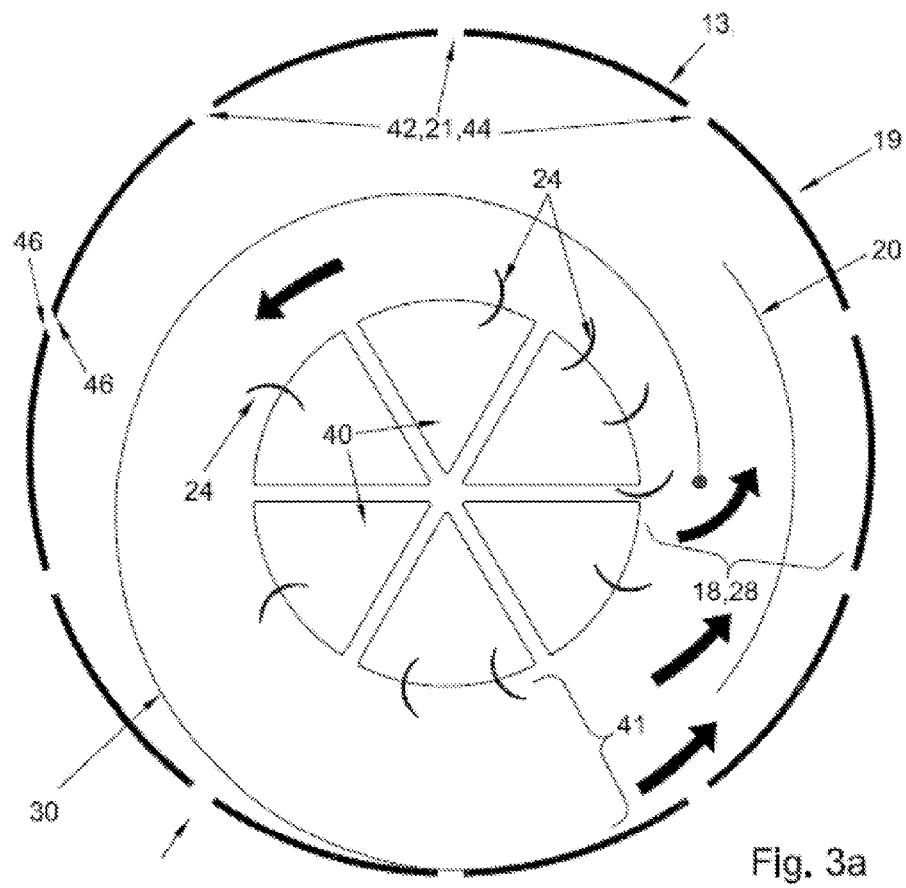
Figure 3B:
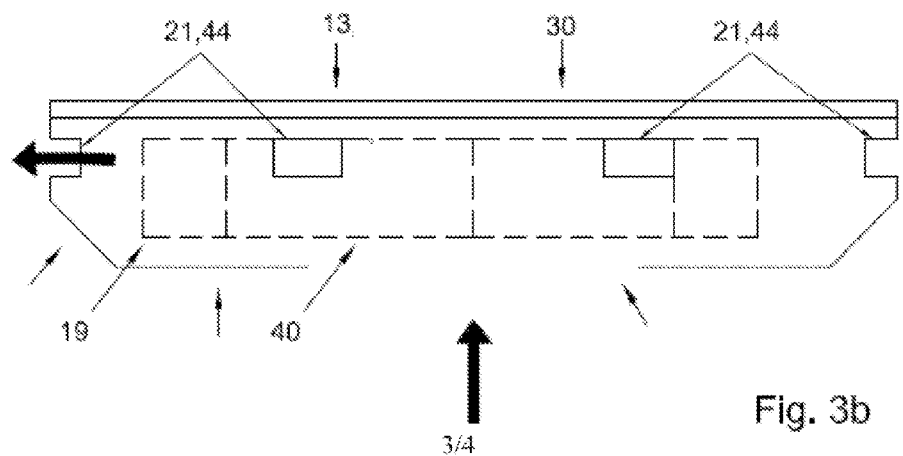
FIG. 3b. A side view of the air feed device from figure a with an air suction opening and air distribution openings.
Figure 4:
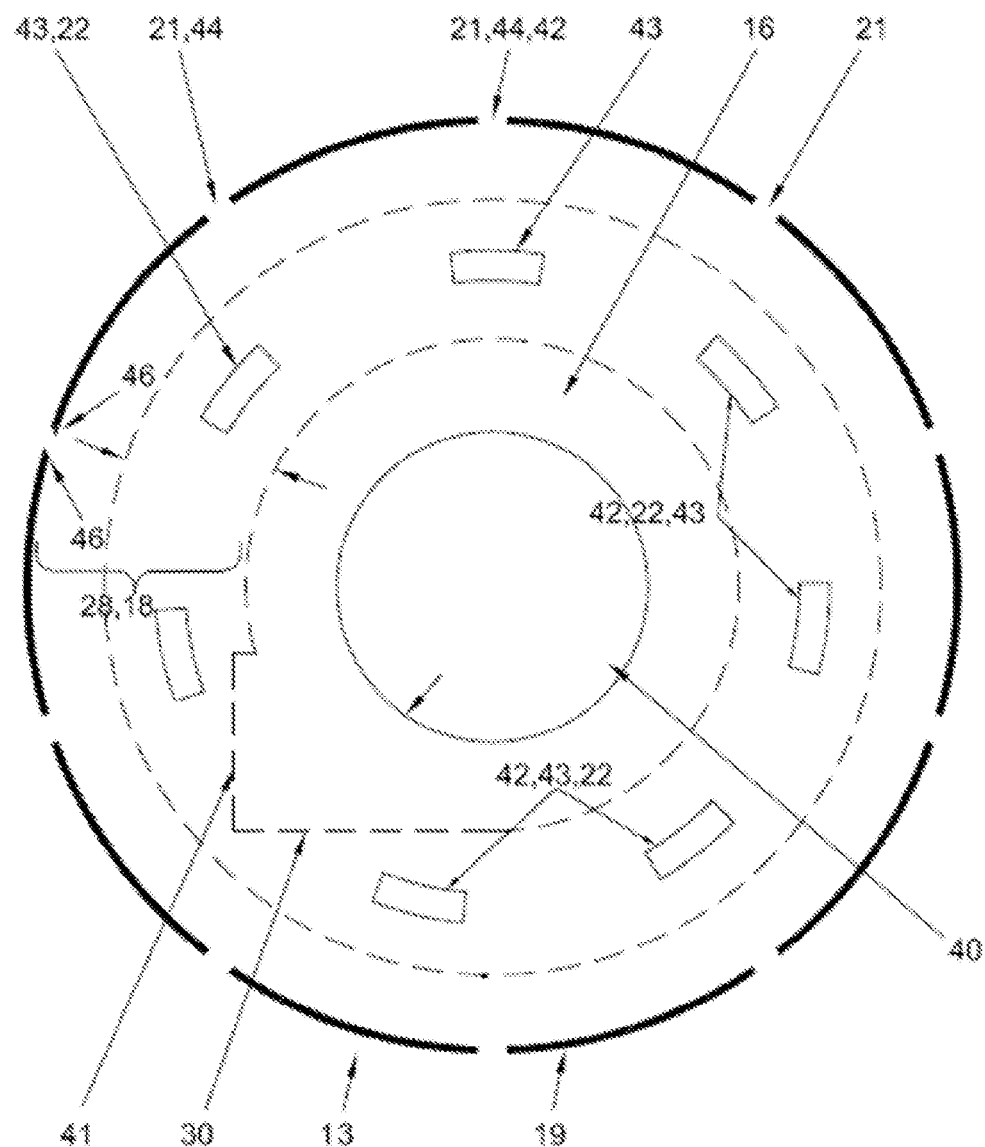
FIG. 4. A top-down view of a second embodiment form of an air feed device from above, with an inner worm-gear housing for the radial impeller and an outer distributor device placed subsequently on the inner warm-gear housing with distributor openings and return-feed openings.

The present teachings relate at least to a vehicle 1. The designation "vehicle" especially means a device to transport persons and/or freight. Conceivable examples are land, water, rail and air vehicles, especially airplanes, ships and automotive vehicles.

The invention in addition relates to at least one air conditioned control section 2. The term "air conditioned control section" especially comprises an object that is to be influenced regarding at least one conditioning parameter, thus subject to a control and/or regulation, especially to bring it at least briefly to a certain target value or in a target range and/or keep it there for a long duration. This preferably holds true for such parts of its surface with which a user can at least potentially come in contact when using the object. The term "control section" especially means an object that is subject to controlling or regulation as regards to at least one quantity. The expression "conditioning parameter" especially relates to a climatic quantity, for example temperature, air humidity, air composition and/or fluid flow velocity. Under consideration among others, are air-conditioned seats, steering wheels, seat bases, office equipment, paneling elements of passenger compartments, storage containers, fuel lines or housings of batteries, engines or other functional elements.

An inner device appropriately comprises at least one item of upholstery 3. The term "upholstery" especially comprises a device to dampen shocks and/or to distribute local pressure points over a larger surface. Examples are blocks of polyurethane foam. This proves a user with a soft support.

Preferably the upholstery 3 comprises at least one through passage for fluid 4. This makes possible the passage of air from one side of the upholstery to the other. In desired fashion an air feed device 8 comprises at least one air guidance duct 5. The designation "air guidance duct" especially means an elongated cavity to transport air to an air exchanger and/or to an air feed device or away from it.

Appropriately at least one air guidance duct 5 has at least partially a position that has a protection against compression by the body weight of a user and as a result an air distribution as loss-free and efficient as possible. A conceivable example is a foam insertion into upholstery or keeping open a recess in the foam of the upholstery.

Preferably at least one air guidance duct 5 has a device that carries with it a distribution along a surface to be ventilated or aerated. Especially suited is an at least partial course on a B side of the upholstery facing away from the user or on a lateral surface lying between the two.

Preferably at least one inner device has at least one cover 6. The word "cover" especially comprises a flat-shaped article which is placed at least in sections on the surface of an object. A conceivable example is air-impermeable or air-permeable layers which contain perforated or unperforated leather and/or textile and are placed on upholstery, or skins that cover at least a part of a surface of a foamlike material.

An additional object of the present invention is at least one air conditioning device. The term "air conditioning device" especially means an object that is suited to influence an air conditioning control section at least in regard to one air-conditioning parameter, especially to bring it at least briefly to a certain target value or in a target range and/or keep it there for a lengthy period. This, for example, aims at a temperature regulation, ventilation, humidifying or dehumidifying, and/or air conditioning for a user, also when situated for a lengthy period in the vicinity of the control section. Among other things, this has to do with temperature control or air conditioning for a seat during lengthy car trips.

In advantageous fashion a ventilation device 7 has at least one air feed device 8. The expression "air feed device" relates especially to a device that can be used for targeted alteration of the air composition or air flows in a certain surface or spatial area, for example an onboard air conditioner, at least partially air-permeable spacer media, spacer textures and/or air-conditioning inserts, and which guides the air fed from at least one air feed device to at least one air exchanger or in the reverse direction.

Appropriately a ventilation device 7 comprises at least one air exchanger 9. The term "air exchanger" especially comprises a device for exchange of air between the air feed device and a zone to be ventilated of an air conditioning control section, the surroundings, an air condition control section and/or a user. Examples are flat components such as spacer fabrics.

In favorable fashion at least one air exchanger 9 at least in part has a position via which an air-conditioning control section can effectively be supplied, for example beneath a seat cover.

Preferably a ventilation device 7 comprises at least one air distribution layer 10. The designation "air distribution layer" especially means a flat component which is air-permeable in at least one direction along its plane, preferably in at least two directions. This promotes planar distribution of air, which was fed in from an air feed device into an air guidance device, or a suctioning out of air at a surface to be air conditioned, to guide it via the air guidance device to the air feed device. Especially suited are spacer fabrics, burling foils, burled foam, open-cell foam, etc.

In desirable fashion an air guidance device 8 has at least one return-feed device 11. The term "return feed device" especially comprises a device for reverse guidance of fluid, especially air, from an air distribution device into an air feed device. This permits better temperature-control performance, even if an air conditioning device has blocked air flow openings such as when, the seat is occupied, and avoids increased fan noise by avoiding a pressure increase.

In favorable fashion a return feed device 11 has at least one return feed line 12. The term "return feed line" especially means a fluid line via which air can flow from an air distribution device to an air feed device.

Preferably at least one return feed line 12 is at least partially of a material that is flexible, elastic, cost-effective, air-impermeable or at least retarding through flow. Conceivable examples are hoses made of rubber or silicone or an upholstery material of a comfort item, into which the air conditioning device is at least partially inserted or embedded.

In advantageous fashion a ventilation device 7 has at least one air feed device 13. The expression "air feed device" relates especially to a device for feeding of air. Among others are radial fans or fans with a partially radial outward flow direction.

In sensible fashion at least one air feed device 13 at least partially has a position which has maintaining upholstery comfort as a consequence, Examples are areas of a comfort item that are at a distance from a user, especially a B side of the upholstery.

In advantageous fashion at least one air feed device 13 at least in part has a position that causes an efficient air distribution in a plane, for example in areas of a ventilation layer that are at a distance to all the edges of a ventilation layer, especially at the center point of same. This avoids deflection of air, accompanied by heavy losses, when air is fed in, as would be necessary with a feed line placed perpendicular to a distributor plane.

In appropriate fashion, at least one air feed device 13 at least partially has the least possible influence on the stability of an upholstery core and as a consequence a further guidance of air as loss-free as possible. Especially suited are feed devices which exhibit an air guidance device placed in the downstream direction or which exhibit at least one housing section the height of which corresponds to the height of the downstream air guidance device.

In appropriate fashion, an air feed device 13 comprises at least one flow device 15. The term "flow device" especially includes a device that, through energy transfer between a fluid and parts of the device, can convert electrical energy into kinetic energy of the fluid. Preferably a flow device comprises a suction intake opening 40 and a blowout opening 41.

Preferably a flow device 15 comprises at least one operational space 16. The term "operational space" especially means a space that is swept over by a impeller when it rotates.

In desirable fashion a flow device 15 has at least one impeller 17. The term "impeller" especially implies a wreath-shaped wheel equipped with a multiplicity of impeller blades.

In favorable fashion at least one impeller 17 has at least partially a suitable feed capacity with low energy consumption and noise levels. Among other values, those for example of 50 to 80 mm are possible.

Preferably at least one impeller has a blade 24 with a shape that produces pressure as high as possible. Conceivable examples are curved blades, the convex part of which points in the rotational direction.

In favorable fashion an air feed device 13 has at least one air predistributor 18. The term "air predistributor" especially means a distributor device 28 for dividing up an air flow fed by an air feed device into multiple partial streams, preferably also for them to be deflected into flow directions differing from each other. This makes possible positioning of the air feed device close to, or in an air distribution layer placed close to the user, and an air distribution effective over a wide area despite using a focused, outward-blowing radial fan.

In sensible fashion, at least one air predistributor 18 has at least in part a form which results in a distribution of air around the housing 30 of the impeller, preferably in, or parallel to, the feed plane of the impeller. Examples are embedding the operating space of the impeller and its housing in a disk-shaped distributor housing.

Preferably at least one air predistributor 18 at least in part has a position that causes a uniform predistribution of air while at the same time ensuring the least possible flow resistance. Especially favorable is air inflow nearly parallel to the wall, with an adjoining helicoid winding of the impeller housing.

In advantageous fashion an air feed device 13 has at least one distributor housing 19. The expression "distributor housing" especially relates to a preferably annular sheathing placed about the operating space of the impeller and its pertinent housing.

One preferred embodiment form results if a material-interlocked connection exists between the distributor housing 19 and the housing 30, especially if manufactured from the same material and in one piece. However, it can sometimes be advisable that a subsequent application is possible, especially by means of a compression fitting.

Appropriately an air predistributor 18 has at least one deflecting vane 20. The term "deflecting vane" especially comprises a wall serving for guidance of fluids. This aims at a low-friction redirection of air flows within the predistributor.

Preferably an air predistributor 18 at least has an additional flow-through opening 42 in the form of a distributor opening 21.

The designation "distributor opening" especially means an opening through which air can pass from a predistributor into an air guidance device and/or an air distributor device. Here outflow openings 44 are meant.

It may be necessary, if a distributor opening 21 is provided in a quantity that results in a uniform distribution around the air feed device. Conceivable examples are distributor openings 21 every 2-3 cm along the outer circumference of the predistributor. Depending on the requirement, it is preferable if a main feed flow is divided up into various partial flows with a low-loss deflection around the predistributor. Especially suited for placement of distributor openings 21 are surfaces that are placed perpendicular to the rotational plane of the impeller and preferably within this rotational plane. An especially advantageous solution results if a high-pressure feed is possible while simultaneously defocusing the outflow. Suited for this for example are surfaces that are placed parallel to the rotational plane of the impeller and preferably within this rotational plane.

In appropriate fashion, at least one distributor opening 21 at least in part has a uniform and low-loss feeding of air into an air distribution device placed downstream. Among others that are possible, these are outflow openings the height of which corresponds to the height of the air distribution device placed downstream or is slight y smaller than it.

Preferably at least one distributor opening 21 at least in part has a form that yields a low-loss and noiseless passage of air through the distributor opening. Examples are through-passage openings whose edges 46 are skewed, to adapt the limitations of the distributor opening of the expansion direction of a flow passing through.

Preferably an air feed device 13 possesses at least one further suction opening 43 in the form of a reverse-feed opening 22. The term "reverse feed opening" especially comprises a flow-through opening 42, through which the air can enter from a reverse-feed line into an air feed device. This promotes efficient reverse feed of air, without having a disadvantageous influence on the feeding of the main flow volume through the feed device.

It can be useful if the return-feed openings 22 are provided in a quantity that results in a uniform feeding of air into the feed device. It can be especially favorable if a number is different from the number of blades of an impeller of the feed device, from the number of webs of the engagement grid on an inflow opening of the air feed device and/or from the number of armatures of an electric motor of an air feed device, or the multiples of these. For example, 3, 5 or 7 are conceivable.

In favorable fashion a reverse-feed opening 22 at least in part has a position which causes inward suction of air from the reverse-feed line into an operational space of an impeller of the air feed device, and a screening off of the feed-in opening from the air accelerated out of the impeller. Especially suitable are walls of the feed device at which the fluid is not deflected, but which lie opposite such deflecting areas, or along which a main air flow flows parallel, A preferred embodiment form is produced if at least one return-feed opening is present in a wall, which lies opposite a feed-in opening relative to the rotational axis of the impeller, especially in an area distant from the rotational axis, swept over by an impeller.

The invention claimed is:

1. An air feed device comprising:
   a. at least one impeller,
   b. at least one impeller housing that at least partially surrounds the at least one impeller,
   c. at least one suction intake opening for intake of air into an operating space of the at least one impeller,
   d. at least one blow-out opening for blowing of air out of the operating space of the at least one impeller, and
   e. a predistributor at least partially surrounding the at least one impeller housing and distributing the blown-out air from the at least one blow-out opening at least partially around the at least one impeller housing,
   wherein the predistributor has at least one through-passage opening for blowing air out of the air feed device, for intake of air into the air feed device, or both, and
   wherein a seat comprises the air feed device.

2. The air feed device according to claim 1, wherein the predistributor includes at least one deflecting Vane, which divides an air flow emerging from the at least one blow-out opening in various directions.

3. The air feed device according to claim 1, wherein the at least one impeller is that of a fan with an at least partially radial, direction of ejection, and the predistributor includes at least one guiding device for deflection of air within the predistributor and at least two outflow openings for air to pass from the predistributor into an air guidance device, an air distributor device, or both.

4. The air feed device according to claim 1, wherein the at least one suction intake opening permits a first main air flow to enter into the air feed device, and the at least one through-passage opening permits a second auxiliary air flow to enter into the air feed device.

5. The air feed device according to claim 1, wherein the predistributor is located in a predistributor housing, and the at least one through-passage opening comprises a first suction opening and at least one second suction opening, both of which are generally located on a same plane,
 wherein the first suction opening and the at least one second suction opening are provided relative to the rotational axis of the impeller on sides of the impeller that are different from each other.

6. The air feed device according to claim 1, wherein the at least One impeller is that of a fan with an at least partially radial direction of ejection, and the predistributor exhibits at least one guiding device for deflection of air within the predistributor,
 wherein the at least one through-passage opening permits air to pass from the predistributor into an air guidance device, an air distributor device, or both, and
 wherein the at least one through-passage opening includes at least two outflow openings that are arranged generally perpendicular to a rotational place of the impeller and extend through a predistributor housing that at least partially surrounds the predistributor.

7. The air feed device according to claim 1, wherein the at least one suction intake opening permits a first main air flow to enter into the air feed device, and a plurality of second intake openings permit a second auxiliary air flow to enter into the air feed device, and
 wherein the plurality of second intake openings are uniformly spaced around the at least one suction intake opening and extend through a predistributor housing that at least partially surrounds the predistributor.

8. A vehicle with the air feed device according to claim 1.

9. An assembly, comprising:
 a. an air feed device having:
  i. an air feed device housing,
  ii. an impeller located in the air feed device housing,
  iii. a suction intake opening for intake of air into an operating space of the impeller, and
  iv. a blow-out opening for blowing air out of the operating space of the impeller,
 b. a predistributor at least partially surrounding the air feed device housing,
 c. a predistributor housing at least partially surrounding the predistributor, the predistributor housing having:
  i. at least one flow-through opening,
 wherein the predistributor distributes air at least partially around the air feed device housing, and
 wherein the at least one flow-through opening provides for air to exit the in feed device, for intake of air into the air feed device, or both.

10. The assembly of claim 9, wherein the at least one flow-through opening comprises two or more outflow openings providing for the air to exit the air feed device, and
 wherein the two or more outflow openings are arranged along an outer circumference of the predistributor housing and are arranged generally perpendicular to a rotational plane of the impeller.

11. The assembly of claim 9, wherein the at least one flow-through opening comprises two or more suction openings providing for the intake of air into the air feed device, and the two or more suction openings are arranged generally parallel to a rotational plane of the impeller.

12. The assembly of claim 10, wherein one or more of the two or more outflow openings include edges that are skewed.

13. The assembly of claim 9, wherein the predistributor housing is a generally annular sheath placed about an impeller housing.

14. The assembly of claim 10, wherein the predistributor includes a spirally-shaped deflecting vane for redirecting air flow within the predistributor.

15. An assembly, comprising:
 a. an air feed device having:
  i. an air feed device housing,
  ii. an impeller located in the air feed device housing,
  iii. a suction intake opening for intake of air into an operating space of the impeller, and
  iv. a blow-out opening for blowing air out of the operating space of the impeller,
 b. a predistributor at least partially surrounding the air feed device housing,
 c. a predistributor housing at least partially surrounding the predistributor, the predistributor housing having:
  i. one or more suction openings, and
  ii. one or more distributor openings,
 wherein the predistributor distributes air around the air feed device housing air,
 wherein the one or more suction openings provide for an additional intake of air, and
 wherein the one or more distributor openings provide for additional blowing of air.

16. The assembly of claim 15, wherein two or more suction openings extend through the predistributor housing and are uniformly spaced on a same plane around the suction intake opening.

17. The assembly of claim 15, wherein two or more distributor openings are arranged along an outer circumference of the predistributor housing and are arranged generally perpendicular to a rotational plane of the impeller.

18. The assembly of claim 15, wherein one or more edges of the one or more distributor openings are skewed, which provide for a reduced or noiseless passage of air.

19. A vehicle comprising a seat comprising the assembly of claim 15.

* * * * *